3,829,320
HARDENING OF REFRACTORY/SODIUM SILICATE MIXTURES

Roger Philip Stanbridge, Cleveland, Ohio, assignor to Foseco International Limited, Birmingham, England
No Drawing. Filed July 7, 1972, Ser. No. 269,863
Claims priority, application Great Britain, July 9, 1971, 32,392/71
Int. Cl. C04b 35/16
U.S. Cl. 106—84                               8 Claims

ABSTRACT OF THE DISCLOSURE

Sand/sodium silicate and analogous mixtures are hardened by a mixture of ethylene glycol monoacetate (EGMA) and ethylene glycol diacetate (EGDA) in which the weight ratio of EGMA to EGDA is 1:1 to 1:9.

---

This invention relates to the hardening of refractory aqueous alkali metal silicate mixtures.

The invention will be described with particular reference to the hardening of sodium silicate/sand mixtures as used, for example, for the production of foundry moulds and cores, but it will be understood that the invention is equally applicable to mixtures of sodium silicate with other refractory materials such as magnesia, alumina or refractory silicates, or corresponding mixtures using other alkali metal silicates.

Numerous additives have been suggested in the literature for hardening sodium silicate/refractory mixes. Many of these have been expensive, unstable or difficult to use because of too long or too short bench life of the silicate/refractory/additive mix. In addition, many additives do not give hardened products of sufficiently high strength for many purposes. A further disadvantage of some previous additives was that the refractory/silicate/ additive mix was very temperature sensitive.

We have now found that particularly satisfactory results may be obtained by the use of a mixture of ethylene glycol mono-acetate (EGMA) and ethylene glycol diacetate (EGDA) in a weight ratio of from 1:1 to 1:9 respectively. Thus, according to the present invention there is provided a hardenable composition comprising a major proportion of a particulate refractory material and a minor proportion of a hardening agent therefor, the hardening agent comprising aqueous alkali metal silicate, ethylene glycol monoacetate and ethylene glycol diacetate, the weight ratio of ethylene glycol monoacetate to ethylene glycol diacetate being in the range 1:1 to 1:9.

Such compositions have satisfactory bench lives, usually in the ranges of 3–50 minutes at room temperature, and lead to products of high strength. They are also relatively insensitive to temperature.

We have found furthermore that if a surface active agent is added to such a composition, then the results are even further improved. It is believed that this is due to the surfactant aiding the dispersion of the mixture in the sodium silicate and this leads to a more homogeneous mixture which enables less silicate to be used for a given final strength. Conversely, for the same silicate usage, higher final strengths are obtainable. The amount used of the surface active agent may vary, but will usually be less than 1.00% of the weight of sodium silicate in the mixture. Generally from 0.05–0.7% by weight, based on the weight of sodium silicate, is satisfactory.

The surface active agent must be chosen with care, especially if it is to be made up and stored either with the sodium silicate or with the ester additive. If storage is not required, a mixture of sodium alkyl sulphonates and secondary alkyl sulphates is satisfactory. If it is desired to mix the surface active agent with the sodium silicate, amphoteric or ampholytic surface active agents of general formula

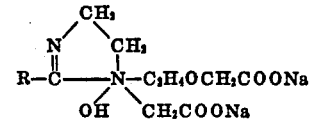

wherein R is a caprylic or ethylhexoic group are satisfactory.

The improving effect of the small additions of surface active agent is greater at high concentrations of ester (e.g. 12–16% based on the weight of the silicate) than at low concentrations of ester (e.g. 8–12% based on the weight of the silicate).

It is further found, that, in the case of foundry moulds and cores, breakdown of the mould or core after casting is much easier. This may in part be due to the fact that, for a given final strength, less sodium silicate need be used, and the less, generally, the sodium silicate content, the easier the breakdown of the cores.

The preferred mixtures according to the present invention thus consist of refractory (preferably silica), sodium silicate, a surface active agent, EGMA and EGDA.

The proportion of the mixture of EGMA and EGDA used is preferably in the range of from 8–20% by weight of the weight of sodium silicate solids present.

A wide variety of sodium silicates may be used. Sodium silicates of $SiO_2:Na_2O$ ratio 2.0–3.3 may be used, but a preferred $SiO_2:Na_2O$ weight ratio range is 2.3–2.7. As regards solids contents, contents of 37–60% by weight may be used, though preferred solids contents are 40–50% by weight.

The present invention includes, in addition to the mixtures noted above, additives for refractory (sodium silicate mixtures which are a mixture of EGMA, EGDA, in which the weight ratio of EGMA to EGDA is from 1:1 to 1:9 optionally containing a surface active agent. The invention further includes the method of making a bonded refractory product which comprises forming a mixture including refractory and sodium silicate and as defined above, shaping the mixture, and allowing the mixture to harden to give a bonded refractory product.

It is to be appreciated that the hardening composition may also contain other ingredients known per se for specific purposes, e.g. sugars to aid breakdown, coal dust, pitch.

The following test results will serve to illustrate the invention. The surface active agent used in composition 6 was a mixture of the two materials of which the structural formula is given above. All tests were carried out at a constant temperature of 20° C. Compositions 1 and 2 are not mixtures according to the invention and are for comparison purposes only. All parts and percentages are by weight.

Four compositions not containing a surface active agent were made up and tested as follows:

| Composition | 1 | 2 | 3 | 4 |
|---|---|---|---|---|
| Sand, parts [1] | 100 | 100 | 100 | 100. |
| Sodium silicate, parts [2] | 3.5 | 3.5 | 3.5 | 3.5. |
| Hardener | Mixture C 0.42 part. | EGDA, 0.42 part. | Mixture A, 0.42 part. | Mixture B, 0.42 part. |

[1] Silica sand A.F.A. grain fineness number 60.
[2] Weight ratio $SiO_2:Na_2O$ 2.5:1, solids content 43.6%.

NOTE.—Mixture A was 17 parts EGMA, 83 parts EGDA; Mixture B was 28 parts EGMA, 72 parts EGDA; Mixture C was a commercial grade of EGMA containing 55 parts EGMA, 40 parts EGDA and 5 parts glycol.

(1) The working time or "bench life" of sand compositions

This was tested by preparing standard A.F.A. compacts at various intervals after mix preparation, allowing these to harden for 24 hours in a sealed container (to eliminate variations in strength due to the evaporation of moisture during setting), and determining the compression strength using a Hounsfield tensometer. A reduction in attainable strength below 200 lb./in.$^2$ defines the maximum working time of bench life of the sand composition.

Composition 1:
Core preparation time Compression strength after 24 hours (lb./in.$^2$)
Core preparation time after mixing (mins.):
½ ---- 255
1 ---- 190
2 ---- 168
3 ---- 112
4 ---- 72
5 ---- 40
Estimated Bench Life less than 1 minute.

Composition 2:
Core preparation time after mixing (mins.):
1 ---- 557
30 ---- 542
60 ---- 504
90 ---- 458
120 ---- 400
130 ---- 193
Estimated Bench Life 125 minutes.

Composition 3:
Core preparation time after mixing (mins.):
1 ---- 598
5 ---- 603
10 ---- 600
20 ---- 607
25 ---- 565
30 ---- 450
35 ---- 290
40 ---- 192
Estimated Bench Life 37 minutes.

Composition 4:
Core preparation time after mixing (mins.):
1 ---- 542
2 ---- 522
3 ---- 430
4 ---- 342
5 ---- 206
6 ---- 172
Established Bench Life 5 minutes.

(2) Strength development characteristics

These determined by preparing test cores immediately after mix preparation, allowing these to harden in an enclosed container, and determining compression strengths at various intervals after core preparation.

Composition 1: Composition strength
Hardening time (hrs.): (lb./in.$^2$)
½ ---- 142
1 ---- 193
2 ---- 190
3 ---- 204
4 ---- 202
5 ---- 211
24 ---- 233

Composition 2: Composition strength
Hardening time (hrs.): (lb./in.$^2$)
½ ---- 0
1 ---- 0
2 ---- 0
3 ---- 166
4 ---- 266
5 ---- 315
24 ---- 534

Composition 3:
Hardening time (hrs.):
½ ---- 0
1 ---- 65
2 ---- 195
3 ---- 255
4 ---- 350
5 ---- 420
24 ---- 590

Composition 4:
Hardening time (hrs.):
½ ---- 112
1 ---- 258
2 ---- 320
3 ---- 410
4 ---- 460
5 ---- 480
24 ---- 538

| Compositions tested | 5 | 6 |
| --- | --- | --- |
| Sand, parts | 100 | 100 |
| Sodium silicate, parts | 2.5 | 2.5 |
| Hardener, mixture A, part | 0.40 | 0.40 |
| Surface active agent, part | Nil | .00125 |

Both of these compositions had "bench lives" of approximately 20 minutes.

Strength development characteristics

Composition 5: Compression strength
Hardening time (hrs.): (lbs./in.$^2$)
½ ---- 10
1 ---- 108
2 ---- 192
3 ---- 232
4 ---- 260
5 ---- 273
24 ---- 328

Composition 6:
Hardening time (hrs.):
½ ---- 10
1 ---- 168
2 ---- 235
3 ---- 278
4 ---- 322
5 ---- 349
24 ---- 472

It can be seen that compared with compositions merely comprising sodium silicate, refractory and EGDA, or an EGMA/EGDA, mixture with more EGMA than EGDA, the compositions of the invention give improved results with respect to final compressive strength and bench life.

The following test indicates the decrease in temperature sensitivity of the composition of this invention.

Mixture were made up as composition 3 above and as composition 3 but with a commercial hardener substituted for Mixture A. The commercial hardener had a composition by weight of 75% triacetin and 25% diacetin. The mixing was carried out at various temperatures and bench life determined as noted above.

Results were as follows:

|  | Bench life (mins.) | |
|---|---|---|
|  | Composition 3 | With commercial hardener |
| Mixing temp. (° C.): | | |
| 10 | 56 | 62 |
| 20 | 37 | 35 |
| 30 | 18 | 8 |

The temperature sensitivity of the commercial hardener mix is thus 2.7 minutes °C., while that of the composition according to this invention is only 1.9 minutes/° C.

In order to determine the effect of the percentage hardener addition on strength, mixtures containing 100 parts by weight sand and 2.5 parts sodium silicate were treated with various amounts of Mixture A as hardener. In one series of tests, 0.00125 parts of surface active agent, as given above, was also added.

The samples were placed in sealed containers at room temperatures for 24 hours, and the hardness then tested. Results were as follows:

| | Compression strength after 24 hours, p.s.i. | | Percent increase in compression strength due to surface active agent |
|---|---|---|---|
| | Without surface active agent | With surface active agent | |
| Amount of mixture A as a percentage of silicate: | | | |
| 8 | 225 | 238 | 5.8 |
| 10 | 262 | 284 | 8.5 |
| 12 | 288 | 346 | 20.2 |
| 14 | 310 | 434 | 39.4 |
| 16 | 328 | 472 | 43.3 |
| 18 | 17 | 456 | 43.8 |

It is clear that the usefulness of adding surface active agent is more pronounced at higher ester usages.

I claim as my invention:

1. A hardenable composition consisting essentially of a major proportion of a particulate refractory material and a minor proportion of a hardening agent therefor present in an amount sufficient to cause hardening, the hardening agent consisting essentially of aqueous alkali metal silicate, ethylene glycol monoacetate and ethylene glycol diacetate, the weight ratio of ethylene glycol monoacetate to ethylene glycol diacetate being in the range 1:1 to 1:9.

2. A composition according to claim 1 wherein the particulate refractory material is sand.

3. A composition according to claim 1 wherein the alkali metal silicate is sodium silicate of $SiO_2:Na_2O$ ratio 2.0 to 3.3.

4. A composition according to claim 3 wherein the combined amount of ethylene glycol monoacetate and ethylene glycol diacetate is 8–20% by weight of the weight of sodium silicate solids.

5. A composition according to claim 3 which includes a minor proportion of a surface active agent.

6. A composition according to claim 5 wherein the amount of surface active agent is 0.05% to 7% by weight of the sodium silicate solids.

7. A composition according to claim 1 and including a minor proportion of a material selected from the class consisting of sugars, coal dusts and pitches.

8. A method of forming a bonded particulate material which comprises mixing a major proportion of particulate material, a minor proportion of an aqueous alkali metal silicate and a minor proportion of a hardener consisting essentially of a mixture of ethylene glycol monoacetate and ethylene glycol diacetate in which the weight ratio of ethylene glycol monoacetate to ethylene glycol diacetate is 1:1 to 1:9, forming the mixture to the desired shape and allowing the mixture to set to form a bonded product.

References Cited

UNITED STATES PATENTS

| 3,138,471 | 6/1964 | Wygant | 106—84 |
| 3,149,985 | 9/1964 | Gandon | 106—74 |
| 3,493,406 | 2/1970 | Fillet et al. | 106—84 |

JAMES E. POER, Primary Examiner

U.S. Cl. X.R.

106—38.35